Dec. 13, 1966    R. A. BARKER ET AL    3,291,617
FROZEN FOOD INDICATORS
Filed March 12, 1963    2 Sheets-Sheet 1
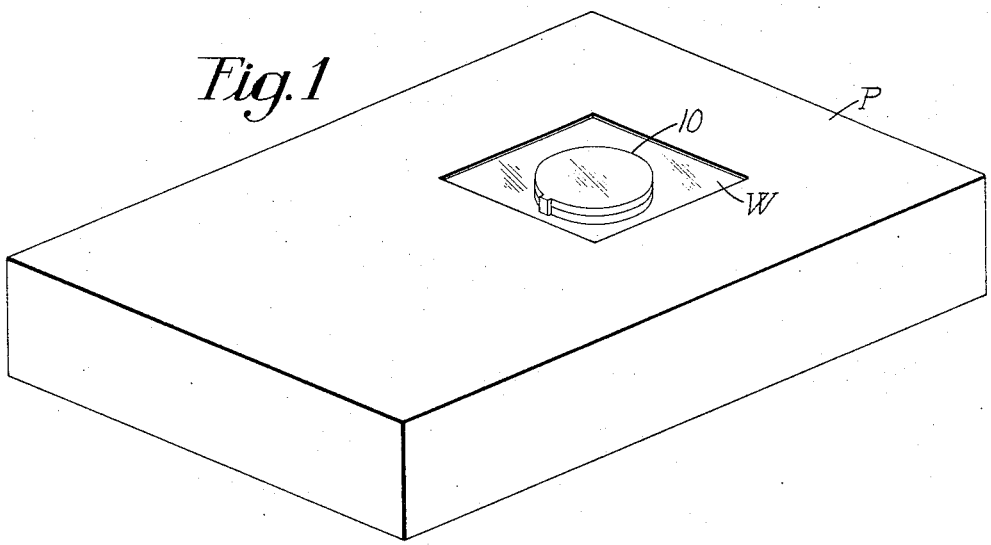
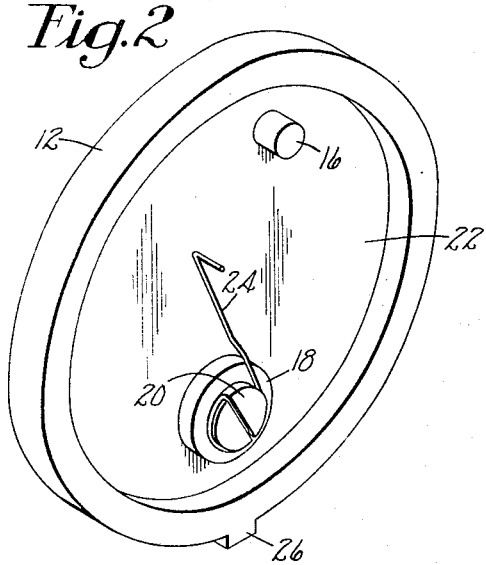 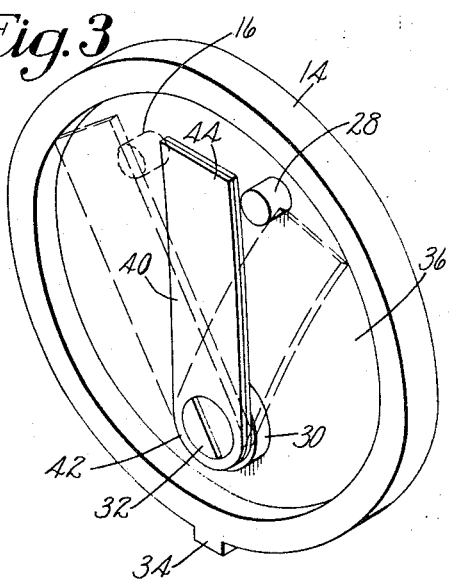
*Inventors*
Robert A. Barker
Howard F. Pratt
By their Attorney
George C. Fuller

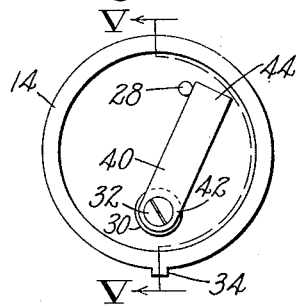
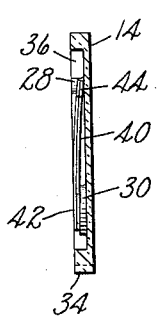
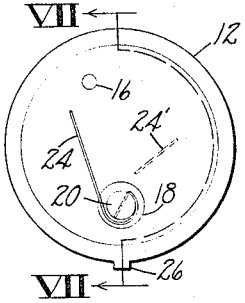
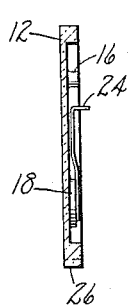
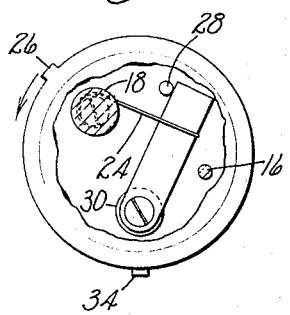
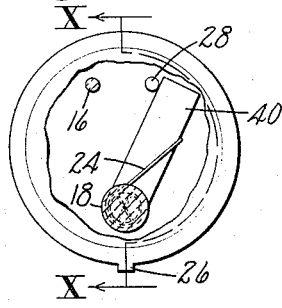
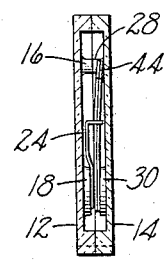
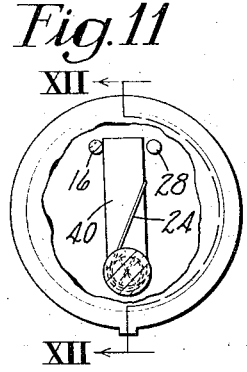
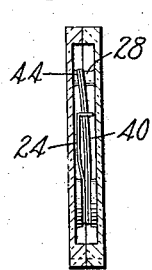
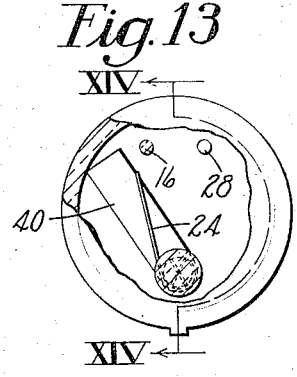
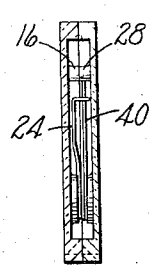

United States Patent Office 3,291,617
Patented Dec. 13, 1966

3,291,617
FROZEN FOOD INDICATORS
Robert A. Barker, Hamilton, and Howard F. Pratt, Ipswich, Mass., assignors to United Shoe Machinery Corporation, Flemington, N.J., a corporation of New Jersey
Filed Mar. 12, 1963, Ser. No. 264,636
5 Claims. (Cl. 99—192)

This invention relates to thermo indicators and more particularly to indicators of the type commonly known as "frozen food indicators" which are adapted to be associated with a package of chilled product to give warning of excessive temperature rise during the chilled period of the package's history.

There are many perishable products such as food and biological materials which may be preserved for long periods by chilling them to a predetermined temperature. Perhaps the largest class of such products comprises the quick-frozen foods which in general remain palatable if maintained below a temperature of 10° F. Other such produces may have other critical temperatures which may not be exceeded if the material is not to be degraded in storage.

Many devices have been proposed for the purpose of providing a warning that cold storage packages have been allowed to exceed their critical temperature, but so far as we are aware, all such devices have had objectionable features whereby they fail to meet commercial requirements for such a device.

Accordingly, it is an object of the present invention to provide a simple economical frozen food indicator suitable for production packaging which is adapted to be attached to or included in packages of products at room temperature without danger of causing a false warning indication during the packaging operation and which, upon chilling of the package to a predetermined temperature, will positively be placed in a "ready" condition to give a warning if a predetermined temperature is thereafter exceeded. The indicator is adapted for use by attachment to or inclusion in individual packages or cartons of packages whereby different purposes may be accommodated and different degrees of thermal lag may be provided.

Other features and advantages of the invention will best be understood from the following description taken together with the accompanying drawings in which, FIG. 1 illustrates a frozen product package carrying an embodiment of the invention;

FIG. 2 is an angular view on a greatly enlarged scale of a portion of the embodiment shown in FIG. 1;

FIG. 3 is a view similar to FIG. 2 of a complementary portion of the embodiment;

FIG. 4 is a full scale plan view of the inner surfaces of a poriton of the embodiment corresponding to FIG. 3;

FIG. 5 is a section taken on line V—V of FIG. 4;

FIG. 6 is a full scale plan view of the outer surface of a complementary portion shown in FIG. 2 illustrating two positions of a spring shown therein;

FIG. 7 is a section taken on line VII—VII of FIG. 6;

FIGS. 8 and 9 are plan views of the embodiment, partly broken away, showing different stages of assembly;

FIG. 10 is a section on line X—X of FIG. 9;

FIG. 11 is a plan view partly broken away of the embodiment in its "ready" condition;

FIG. 12 is a section on line XII—XII of FIG. 11;

FIG. 13 is a plan view partly broken away of the embodiment in its "warning" condition; and FIG. 14 is a section on line XVI—XIV of FIG. 13.

Referring to the drawings, the device comprises a support or case 10 comprising two symmetrical circular portions 12 and 14. The portion 12 carries a stop in the form of a re-entrant stub 16 and a re-entrant stepped post 18 having a flat-faced pivot tip 20 formed with a slot disposed at an angle of approximately 45° to the radius passing through the tip. Suitably the portion including the stub and post are formed integrally of clear plastic. A wire spring 24 is wraped partly about the tip 20 of the post 18 and has one end received in the slot with a firm fit thus preventing the spring from falling off the post when the portion 12 is held with the inner surface 22 down while the other end is formed with a 90° bent tip. Suitably to facilitate orientation in assembly, a projection 26 may be formed in the periphery of the portion 12 radially of the axis of the post 18. The portion 14 similarly has a stop in the form of a stub 28, and a stepped post 30 having a flat-faced pivot tip 32. A peripheral projection 34 corresponds to the projection 26 of the portion 12 while the inner surface 36 corresponds to the surface 22.

An indicator arm 40 comprising a bimetal strip having a suitable length shorter than the inside diameter of the portion 14 has a base portion 42 pivoted on the tip 32 of the post 30 for swinging of an end portion 44 about a fixed axis. Referring to FIGS. 4 and 5, the bimetal strip is oriented so that at room temperature it curves so that its end portion 44 lies outside the plane of its base portion toward the inner surface 36 while when exposed to a lower temperature it bends to move the end portion 44 axially and outwardly from the surface 36. Thus the strip 40 is positioned to engage the stub 28 at room temperature, while at a lower predetermined temperature response of the strip 40 will cause its end portion 44 to clear the stub 28 so that the strip 40 may swing laterally to the left to index the strip past the stub 28 to the stub 16 as seen in FIG. 11.

Means for yieldably urging the strip to rotate on the pivot tip 32 is provided by the spring 24 of the portion 12. The wound or stressed disposition of the spring is indicated by the reference numeral 24' (FIG. 6).

In assembly, as shown in FIGS. 8 and 9, the strip and spring are assembled to the case portions, and the portion 12 is then disposed with the inner surfaces of the portions facing each other and with the outturned tip of the spring 24 in engagement with the right side of the strip as seen in FIG. 8. In this disposition the spring 24 extends across the strip 40 substantially perpendicular thereto. The case portions are then relatively rotated to bring the pivot tips 20 and 32 of the posts 18 and 30 into alignment. Thus, the spring will be wound and assume the disposition illustrated in FIG. 9. The tip 32 then opposes the tip 20 with the slots in angular relation to hold the spring 24 in its slot while the spring holds the base 42 of the strip on the tip 32. The stubs 16 and 28 are then spaced laterally apart. The case portions may be united in this relative disposition by suitable bonding means such as waterproof adhesive. The projections 26 and 34 facilitate the mechanical or manual alinement of the case portions in their proper relative disposition although they may be omitted if desired.

In use, the indicator device may be adhesively attached to an individual package, may be disposed inside a package P (FIG. 1) while being visible through a window W therein, or the device may be used in a carton of food packages, for example, to indicate that the shipper has maintained the necessary conditions to preserve the quality of the food. During the freezing operation the strip 40 will bend to assume the shape illustrated in FIG. 12. At a predetermined temperature, suitably near the minimum temperature to be attained, the end portion 44 of the strip will clear the stub 28 permitting the spring 24 to index the strip past the stub 28. The end portion 44 will now engage the stub 16 where it will remain until the temperature of the strip 40 has risen to a predetermined temperature causing the end portion 44 to move away from the surface 22 until it clears the stub 16. At this instant, the strip 40 is rotated by the spring 24 into the warning position shown in FIGS. 13 and 14.

It will be obvious that, if desired, one of the case portions may be formed integral with the surface of a container.

Having thus described our invention, what we claim as new and desire to secure by Letters Patent of the United States is:

1. An indicator for frozen food packages comprising, in combination, a support, an arm pivoted on said support for swinging of an end portion of said arm about a fixed axis, said arm embodying means responsive to temperature for moving said end portion in the direction of said axis to position said end portion variably in accordance with temperature, means yieldably urging said arm to rotate on said axis, first stop means carried by said support and providing a surface adapted to be engaged by said end portion only at temperatures greater than a first predetermined value whereby axial movement of said portion during cooling releases it from said first stop means at said predetermined value for rotation of said arm by said urging means, second stop means carried by said support and providing a surface adapted to be engaged by said end portion, after release thereof from said first stop means, only at temperatures below a second predetermined value higher than said first predetermined value whereby a rise in temperature above said second predetermined value releases said arm from said second stop means for rotation to a warning disposition.

2. An indicator for frozen food packages comprising, in combination, a case formed with a pivot post, a bimetallic strip pivoted on said post for rotation within the case, a spring yieldably urging said strip to rotate, first stop means carried by said case and providing a surface adapted to be engaged by an end portion of said strip only at temperatures greater than a first predetermined value whereby the bending of said strip during cooling thereof releases it from said first stop means at said predetermined temperature for rotation by said spring, second stop means carried by said case and providing a surface adapted to be engaged by said end portion, after release thereof from said first stop means, only at temperatures below a second predetermined value higher than said first predetermined value whereby a rise in temperature above said second predetermined value releases said strip from said second stop means for rotation to a warning disposition.

3. An indicator for frozen food packages comprising, in combination, a pair of case portions assembled to form a hollow closed case and formed with similar interior contours comprising for each portion an inwardly directed post having a flat-faced pivot tip aligned with the pivot tip of the other portion in assembled relation of the two portions, a bimetal strip pivoted on the tip of one post, a spring mounted on the other post and cooperating with said strip for urging it to rotate, and stop means comprising a re-entrant stub on each case portion for sequentially cooperating with said strip for controlling its rotation to permit indexing of said strip from one stub to the next upon chilling of the strip to a first predetermined temperature and to permit indexing of the strip beyond said other stub upon warming of the strip beyond a predetermined temperature.

4. A device as in claim 3 in which said posts and said stubs are formed integrally with the case portions.

5. A pair of identical case portions assembled to form a hollow closed case, each portion being formed integrally with a re-entrant post having a flat-faced pivot tip and a re-entrant stub, the posts and stubs being disposed in assembled relation with the tips of said posts aligned in mutual engagement while said stubs are spaced laterally apart, a bimetal strip having a width less than the spacing of the stubs and having a base portion pivoted on the tip of one post, a spring carried by the other post and arranged to urge said strip into engagement with one of said stubs, said strip and said stub cooperating for control of the rotation of the strip to permit indexing thereof from one stub to the other upon a drop in temperature to a first predetermined value and to permit indexing of the strip beyond said other stub upon a rise in temperature to a second predetermined value.

References Cited by the Examiner
UNITED STATES PATENTS

| 2,327,336 | 8/1943 | Bolesky | 73—378.3 |
| 2,966,060 | 12/1960 | Bradbury | 73—378.3 |
| 2,966,261 | 12/1960 | Bradbury | 99—192 |

A. LOUIS MANOCELL, *Primary Examiner.*

D. J. DONOVAN, *Assistant Examiner.*